No. 873,190.  PATENTED DEC. 10, 1907.
E. F. UPTON.
STEERING WHEEL.
APPLICATION FILED APR. 18, 1907.

Witnesses

Inventor
Edmund F. Upton
by
Attorneys

UNITED STATES PATENT OFFICE.

EDMUND F. UPTON, OF MINERAL CITY, OHIO.

STEERING-WHEEL.

No. 873,190.  Specification of Letters Patent.  Patented Dec. 10, 1907.

Application filed April 18, 1907. Serial No. 368,931.

*To all whom it may concern:*

Be it known that I, EDMUND F. UPTON, a citizen of the United States, residing at Mineral City, in the county of Tuscarawas and State of Ohio, have invented certain new and useful Improvements in Steering-Wheels; and I do declare the following to be a full, clear, and exact description of the invention, such as will enable others skilled in the art to which it appertains to make and use the same.

This invention relates to steering wheels for automobiles, boats, and similar uses, and it has for its object to provide a device which can be manufactured very cheaply, and which will produce a durable and efficient structure.

Figure 1:
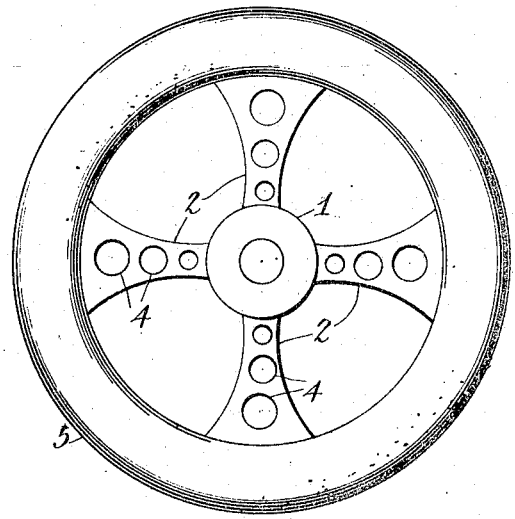
Figure 2:
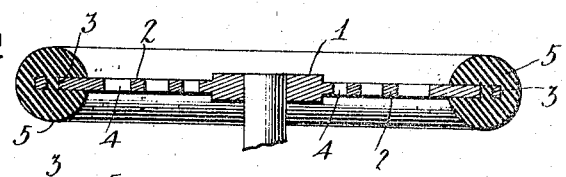
Figure 3:
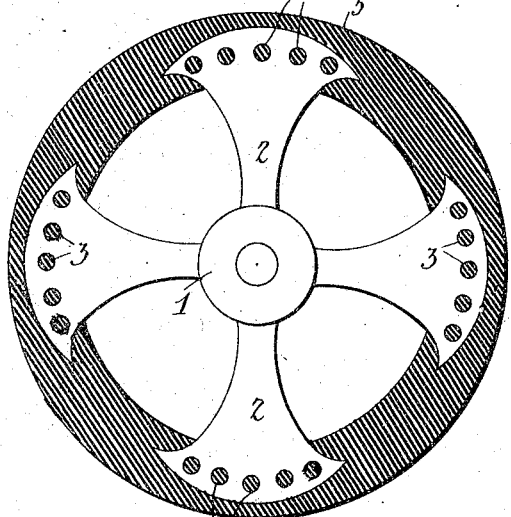
Figure 4:
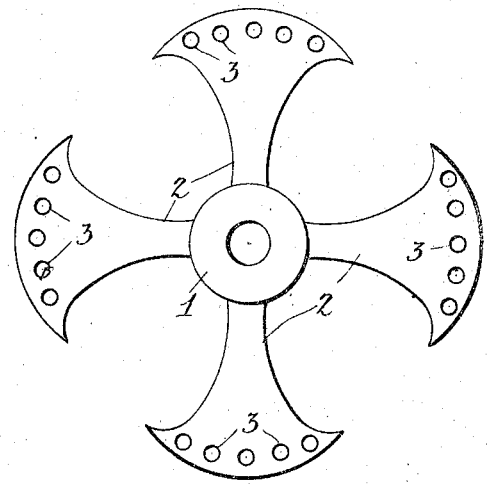

In the accompanying drawings, which illustrate the invention, Figure 1 is a plan view of a wheel embodying the invention; Fig. 2 is a central cross sectional view of the same; Fig. 3 is a sectional view taken at right angles to Fig. 2; and Fig. 4 is a plan view of the web or central portion of the wheel.

Referring more particularly to the drawing, 1 indicates the hub of the wheel, which may be provided with any suitable means for securing it upon a rod or shaft, as the steering stem or handle of an automobile.

Extending radially from the hub are a plurality of spokes, 2, which are preferably formed from thin, flat material with perforations, 3, at their ends and with or without perforations, 4, intermediate their ends. The spokes are preferably arranged diametrically opposite each other with their outer ends extended, and are made substantially fan-shape with their sides curved.

Secured to the outer ends of the spokes is a rim, 5, which is formed from vulcanized or hard rubber, and is given any desired shape or form in cross section, circular being preferred. The rim is secured to the ends of the spokes by providing a suitable mold or vulcanizing apparatus, in which the ends of the spokes are secured and the proper amount of rubber or other suitable material is placed, and the entire outfit subjected to the proper degree of heat and pressure as to solidify or harden the rim. The material will be forced through the perforations 3 and thereby bind the rim and spokes together in substantially as rigid a manner as though they were formed integral.

By constructing the spokes from thin, flat material, and arranging them flat-wise of the plane of the wheel, they can be constructed very light and yet possess sufficient strength to enable them to withstand any strain that may be placed upon them when the wheel is rotated to guide the automobile, or accomplish whatever other result is desired to be attained. By curving the sides of the spokes the portions that enter the rim of the wheel form shoulders which engage with the material upon the inner side of the rim and thereby assist in holding the rim in position by preventing the outward movement at that point. By providing the perforations 4 as shown in Fig. 4, the spokes can be made still lighter without materially detracting from their strength. By constructing a wheel in this manner, the rim is not liable to warp or crack, thereby securing a smooth and uniform gripping surface for the hand of the operator. It is also substantially a non-conductor of heat, and will also afford a good gripping surface, even though when polished or made very smooth.

Having thus described my invention, what I claim as new and desire to secure by Letters-Patent, is:

In a wheel of the type described, a hub, a plurality of radiating spokes carried thereby, said spokes having enlarged flaring outer ends, each provided with a series of perforations, and a rim composed wholly of moldable material and having the enlarged ends of the spokes embedded therein during formation of the rim, the material of the rim being adapted while in the plastic state, to fill said perforations for securely anchoring the spokes within the rim, and the moldable rim serving as the sole connection between the ends of the spokes.

In testimony whereof I have hereunto set my hand in presence of two subscribing witnesses.

EDMUND F. UPTON.

Witnesses:
 M. E. FISHER,
 JOHN M. ELDER.